United States Patent
Abe et al.

(10) Patent No.: US 6,268,663 B1
(45) Date of Patent: Jul. 31, 2001

(54) POWER SUPPLY CONTROLLER FOR VEHICLE WITH FUNCTION OF PREVENTING RUNNING DOWN OF BATTERY

(75) Inventors: Ken Abe; Shigeki Itabashi; Hiroshi Tutumi; Masaaki Imamura, all of Tokyo (JP)

(73) Assignee: Furukawa Electric., Ltd. (JP)

( * ) Notice: Subject to any disclaimer, the term of this patent is extended or adjusted under 35 U.S.C. 154(b) by 0 days.

(21) Appl. No.: 09/445,535

(22) PCT Filed: Jun. 16, 1998

(86) PCT No.: PCT/JP98/02639

§ 371 Date: Dec. 7, 1999

§ 102(e) Date: Dec. 7, 1999

(87) PCT Pub. No.: WO98/57826

PCT Pub. Date: Dec. 23, 1998

(30) Foreign Application Priority Data

Jun. 18, 1997 (JP) ................................. 9-161072

(51) Int. Cl.[7] ................................. B60R 16/02
(52) U.S. Cl. ............... 307/10.6; 307/10.7; 307/10.8; 315/84; 340/458
(58) Field of Search ................ 307/10.1, 10.7, 307/10.8, 10.6; 315/77, 84; 340/309.4, 309.15, 455, 438, 458

(56) References Cited

U.S. PATENT DOCUMENTS

| | | | |
|---|---|---|---|
| 5,304,896 | * 4/1994 | Asada et al. | 315/84 |
| 5,321,309 | * 6/1994 | Kolomyski | 307/10.8 |
| 5,521,443 | * 5/1996 | Imura et al. | 307/10.2 |
| 5,693,986 | * 12/1997 | Vettraino, Jr. et al. | 307/10.7 |

FOREIGN PATENT DOCUMENTS

| | | |
|---|---|---|
| 50-49623 | 5/1948 | (JP) . |
| 57-122440 | 1/1956 | (JP) . |
| 64-41435 | 2/1989 | (JP) . |
| 4-48063 | 4/1992 | (JP) . |
| 9-202195 | 8/1997 | (JP) . |

* cited by examiner

Primary Examiner—Fritz Fleming
(74) Attorney, Agent, or Firm—Bierman, Muserlian and Lucas

(57) ABSTRACT

This invention proposes a control device for an electric source supply, providing a function which prevents battery death of a vehicle. A lamp main relay turns a lamp main relay 3 off in case an ignition switch 1a is off and also when a door state is not changed over time T1 which is predetermined with a timer Tm1, and cuts off an electric source supply to an interior dome lamp 5, door lamps 6a, 6b, 6c of D-seat, P-seat, R-seat in order to prevent battery death. Further, a door/interior dome lamp control part 2c turns the interior dome lamp 5 and the door lamps in response to opened-doors off when doors are not closed more than time T2 which is predetermined with timer means Tm2 in order to prevent battery death. A warning signal may be generated before the control for preventing battery death or during the control mode for preventing battery death.

2 Claims, 6 Drawing Sheets

POWER SUPPLY CONTROLLER FOR VEHICLE WITH FUNCTION OF PREVENTING RUNNING DOWN OF BATTERY

BACKGROUND OF THE INVENTION

1. Field of the Invention

This invention relates to an electric source control device providing a function which prevents battery death for a vehicle. More particularly, this invention relates to a vehicle electric source control device providing a function which prevents battery death caused by leaving interior dome lamps or door lamps to be lighted.

2. Prior Art

A vehicle is usually equipped with an interior dome lamp which throws light over a vehicle interior, and door lamps which throw light on people's foot areas when they get in or get out of the vehicle and inform following vehicles that a door is opened.

The above-mentioned interior dome lamp is controlled by a switch which is changeable, having an "ON mode", an "OFF mode" and a "DOOR mode". In case the switch is in the "ON mode", the interior dome lamp is on at all times. When the switch is changed to "OFF mode", the interior dome lamp is off. Moreover, when the switch is changed to "DOOR mode", the interior dome lamp is on when any door is opened, and the interior dome lamp is off when all doors are closed.

Also, the interior dome lamp is left to be on during a predetermined time after all doors are closed in order to make it much easier for a driver to prepare for driving at night.

An Electronic Control Unit (hereinafter referred to as ECU) usually performs the above-mentioned control. The ECU receives a door switch state input and generates an output in response to it, which then operates a lamp main relay and switches the interior dome lamp etc. on or off according to the output.

In the above-stated conventional interior dome lamp control system, battery death is sometimes caused because the interior dome lamp is left on.

There is, for example, a case that a driver switches on the interior dome lamp or the map lamp in a dark place, for example in a tunnel, however after getting out of the tunnel he or she forgets to switch them off and parks the vehicle where surroundings are light.

Also, in case the lamp switch is changed to "DOOR mode, when a driver leaves a vehicle he or she may not realize the door is not completely closed.

The present invention takes the above-mentioned matter into consideration, and the object is to provide a vehicle electric source control device which prevents battery death caused by leaving lamps lighted or by a door that is not completely closed.

DISCLOSURE OF THE INVENTION

The present invention solves above-stated problems as below.

(1) Means for judging a state of a door switch and an ignition switch, control means for preventing battery death by tuning lamps on or off based on the state of the door switch and the ignition switch, and output means for controlling the lamps in response to the control means are provided.

And the control means turns off the lamps in case the ignition switch is off and also when the door switch is not changed from a door open state to a door close state within a predetermined time.

(2) Means for judging a state of a door switch and an ignition switch, control means for controlling a switching circuit which controls the electric source supply to a lamp system of a vehicle in order to prevent battery death, based on the state of the door switch and the ignition switch, and output means for turning the switching circuit on or off in response to an output of the control means are provided.

And the control means cuts off the electric source supply to the lamp system of a vehicle by turning the switching circuit off in case the ignition switch is off and also when a door state is not changed within a predetermined time.

(3) In (1), (2), timer means which starts a time check in case the ignition switch is off and when the door state is changed is provided in the control means. The timer means is reset and starts a time check when the door state is changed while it counts time.

(4) In (1), (2) and (3), a warning signal generator gives a warning signal to prevent battery death before the control means operates to prevent such battery death.

(5) In (1), (2) and (3), a warning signal generator gives a warning signal in response to the door state, to inform the user that the vehicle is under control for preventing battery death when the control means is operating to prevent such battery death.

According to the present invention, as above-mentioned in paragraph (1), in case the ignition switch is off, and when a door is not closed within the predetermined time, the lamp which is lighted in response to the door switch is put out automatically. For example, if a door is not completely closed, the interior dome lamp (DOOR mode) and the door lamp are not left on, thereby preventing battery death.

Here, in case the ignition switch is on, the engine drives normally, and therefore the control for preventing battery death is not performed.

Still further, according to the present invention, as above-mentioned in paragraph (2), in case the ignition switch is off, and when the door state is not changed within the predetermined time, the electric source supply is cut off by turning the switching circuit which controls the electric source supply to the lamp system of a vehicle off, thereby preventing battery death caused by leaving an interior dome lamp and map lamp on.

Still further, according to the present invention, as above-mentioned in paragraph (3), a timer means which starts a time check in case the ignition switch is off and when the door state is changed, then controls output means after the predetermiined time is provided. The timer means is reset and starts to count time when the door state is changed while it counts time (for example, when a driver leaves a vehicle with a door that is not completely closed, and gets in the vehicle again). Thereby, the control means is not placed in a mode to control for preventing battery death due to the counted time until then.

Further, according to the present invention, as above-mentioned in paragraph (4), as the warning signal generator which gives the warning signal to inform a shifts to preventing battery death before the control means becomes in condition of said preventing is provided, users are not puzzled when the interior dome lamp is put off suddenly. If there is no the signal, users may be astonished as the lamp puts off suddenly without any operation.

Furthermore, according to the present invention, as above-mentioned in paragraph (5), a warning signal is given in response to the door state to inform the user that the vehicle is under control for preventing battery death when the control means is operating to prevent such battery death. Thereby, users realize that control for preventing battery death is operating. Without the warning, users may doubt or not realize that trouble exists. (The control for preventing battery death can be canceled by turning the ignition switch ON or closing all doors, which many users may not know). This function makes possible an immediate judgment as to whether the control system is out of order or the control for preventing battery death is operating when an ECU is inspected for possible problems in the manufacturing line or in maintenance. Also, for example, when a lamp is suddenly put out in the door open state, vehicle mechanics who do not know the control system for preventing battery death very well can sensibly realize that the operation is caused by the ECU for managing the lamp.

DETAILED DESCRIPTION OF THE INVENTION

The present invention may be more fully understood by reference to the attached drawings.

Figure 1:
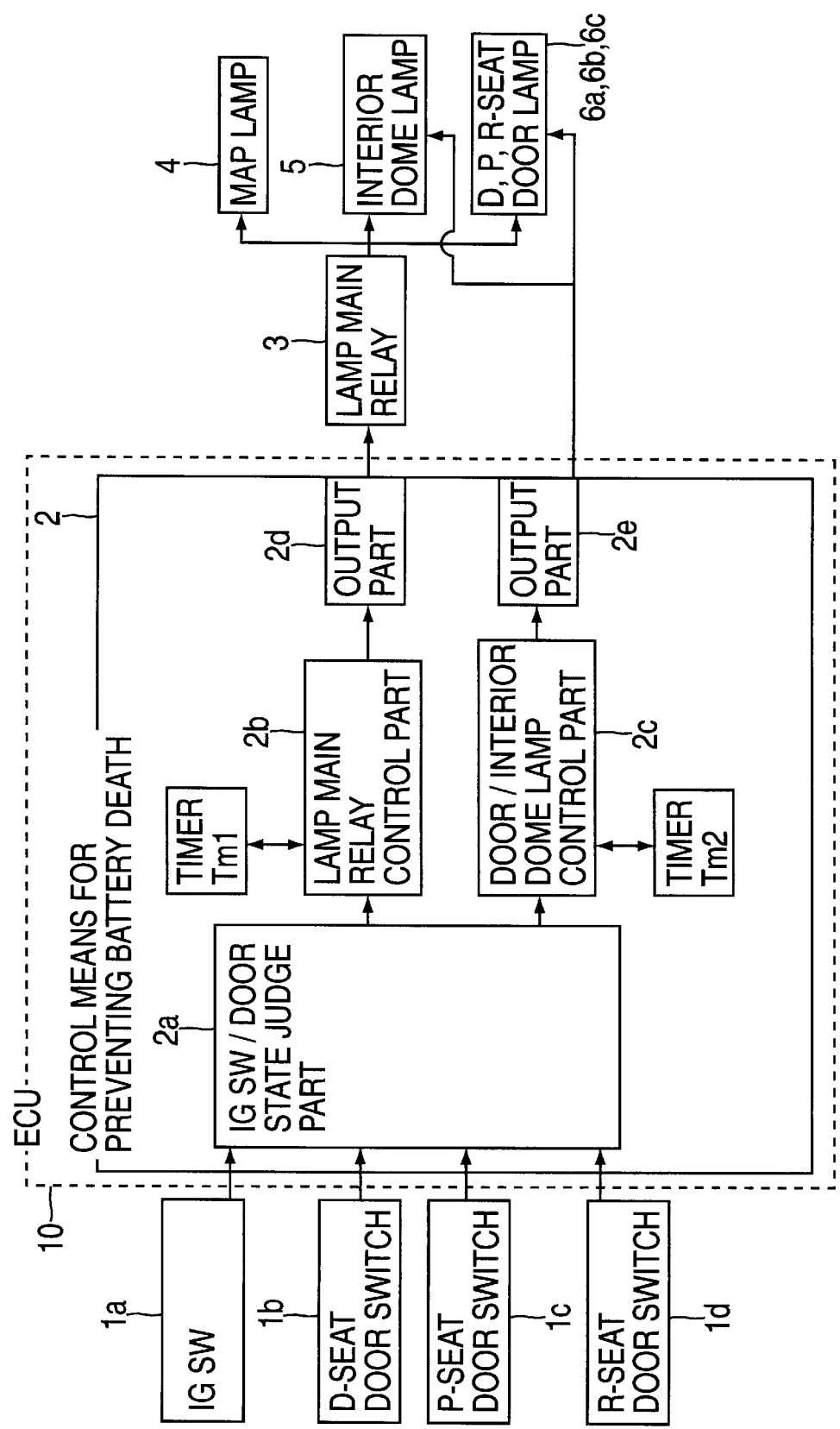
FIG. 1 is a block diagram of the first preferred embodiment according to the present invention.

FIG. 1 shows a block diagram showing the elements of the first preferred embodiment according to the present invention. In FIG. 1, elements 1a–1d show switches which are provided in a vehicle—1a shows an ignition switch (hereinafter referred to as an "IG" switch), 1b shows a door switch which is to be turned on when a door on the driver's seat side (hereinafter referred to as the D-seat) opens (hereinafter this switch is referred to as the D-seat door switch), 1c shows a door switch which is to be turned on when a door on the passenger's seat side (hereinafter referred to as the P-seat) opens (hereinafter this switch is referred to as the P-seat door switch), 1d shows a door switch which is to be turned on when a door of the rear seat (hereinafter referred to as the R-seat) opens (hereinafter this switch is referred to as the R-seat door switch).

Element 10 shows an ECU, which provides a control means for preventing battery death 2; a lamp main relay 3 which controls the electric source of a lamp system; and an interior dome lamp 5. Door lamps 6a, 6b, 6c in response to the D-seat, P-seat, and R-seat are controlled by the control means for preventing battery death 2.

Figure 2:
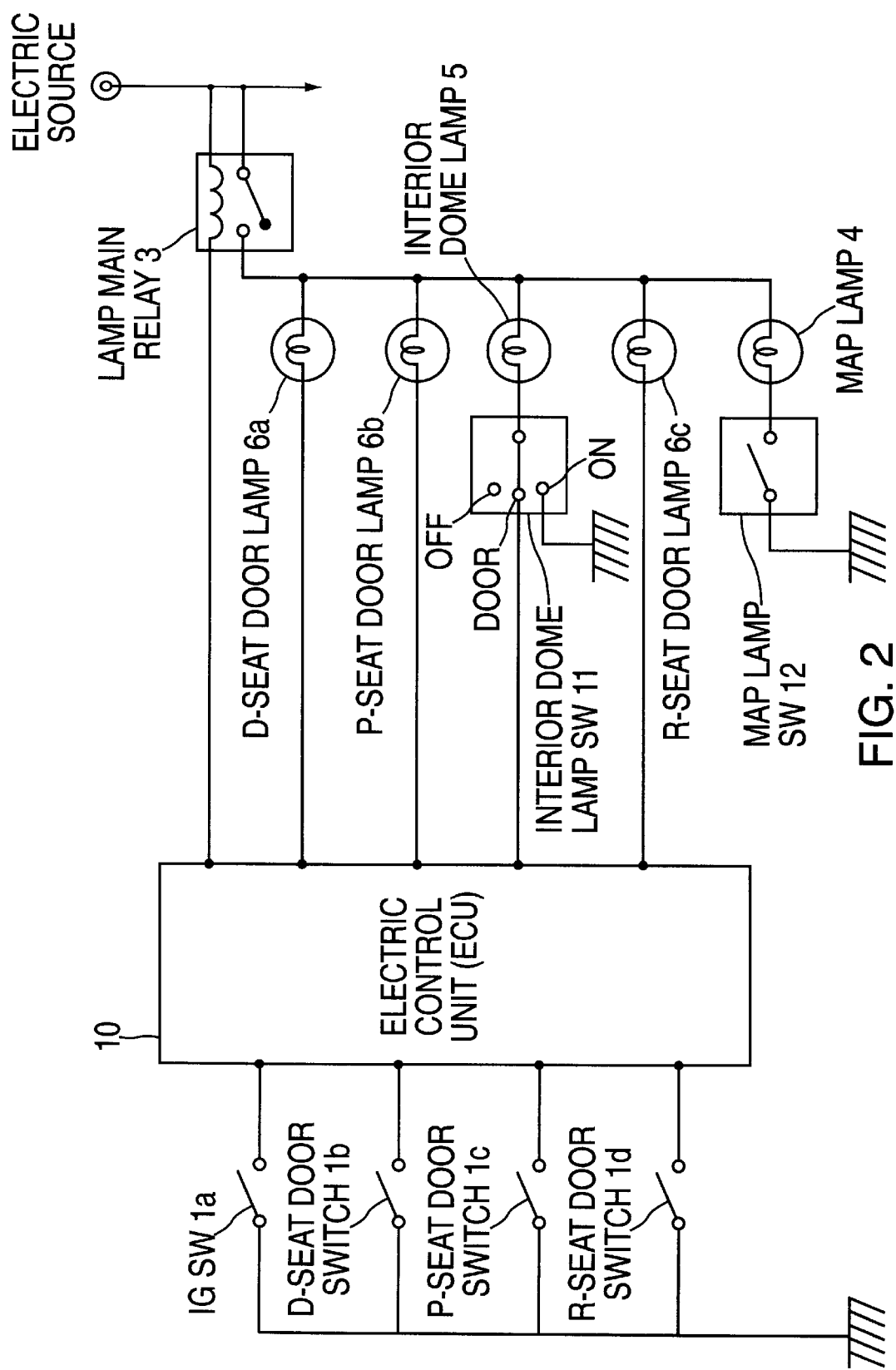
FIG. 2 is an external view of a control device of the first preferred embodiment according to the present invention.

FIG. 2 shows an external view of the control device of the first preferred embodiment according to the present invention. In FIG. 2, elements 1a–1d show the above-mentioned IG switch, D-seat door switch, P-seat door switch, and R-seat door switch respectively. Their outputs are connected to the ECU 10.

Element 3 shows the above-mentioned lamp main relay. When the lamp main relay 3 operates, electric power is supplied to the D-seat door lamp 6a (which is lighted when the door of D-seat opens), the P-seat door lamp 6b (which is lighted when the door of P-seat opens), the R-seat door lamp 6c (which is lighted when the door of R-seat opens), the interior dome lamp 5 and map lamp 4.

The interior dome lamp 5 is connected to an interior dome lamp switch 11, which has three positions, namely "ON-mode", "DOOR-mode" and "OFF-mode".

In case the lamp main relay 3 operates, when the interior dome lamp switch 11 is changed to "ON-mode" the interior dome lamp 5 is lighted. On the other hand, when the interior dome lamp switch 11 is changed to "DOOR-mode", the interior dome lamp 5 is lighted in case a door opens and the interior dome lamp 5 is turned off in case all doors are closed (in case the control for preventing battery death is not in operation). In case the interior dome lamp switch 11 is changed to "OFF-mode", the interior dome lamp 5 is turned off permanently.

The map lamp 4 is connected to a map lamp switch 12. In case the lamp main relay 3 operates, when the map lamp switch 12 is on, the map lamp 4 is lighted.

Referring to FIG. 1, the control means for preventing battery death 2 provides an IG SW/door state judging part 2a which judges the state of the IG switch 1a, the D-seat door switch 1b, the P-seat door switch 1c and the R-seat door switch 1d; a lamp main relay control part 2b which controls the lamp main relay 3; and a door/interior dome lamp control part 2c which controls the turning on or off of the door lamps 6a, 6b, 6c and the interior dome lamp 5.

The lamp main relay control part 2b operates a timer Tm1 based on an output of the IG SW/door state judging part 2a and controls the lamp main relay 3 through an output part 2d. Also, the door/interior dome lamp control part 2c operates a timer Tm2 based on an output of the IG SW/door state judging part 2a and controls the turning on or off of the interior dome lamp 5 and the door lamp of D-seat, P-seat and R-seat through an output part 2e. Here, the IG SW/door state judging part 2a, the lamp main relay control part 2b and the door/interior dome lamp control part 2c are executed by software.

(a) In case the ignition switch 1a is on:

In this case, as the engine operates normally, the ECU performs a normal control instead of the control for preventing battery death. Namely, the ECU activates the lamp main relay 3, which causes electric power to be supplied to the interior dome lamp 5, the door lamps 6a, 6b and 6c of D-seat, P-seat and R-seat and the map lamp 4, respectively.

When the interior dome lamp switch 11 is changed to the DOOR-mode, the interior dome lamp 5 is lighted in case a door is opened and the interior dome lamp 5 is turned off in case all doors are closed. Hereinafter, the case that the interior dome lamp switch 11 is changed to the DOOR-mode will be explained.

Further, when a door opens the door lamp 6a, 6b or 6c in response to the door of D-seat, P-seat and R-seat is lighted.

(b) In case the ignition switch is off, and when a door state is not changed more than a predetermined time:

The lamp main relay control part 2b counts time all the while that the door state is not changed, with timer Tm1. When the door state is not changed (the door is not opened or closed) more than the predetermined time T1 of the timer Tm1, the lamp main relay 3 is operated to its off state, and the electric source supply to the interior dome lamp 5, the door lamps 6a, 6b, 6c of D-seat, P-seat, R-seat, and the map lamp 4 is cut off. Here, the timer Tm1 is reset when the door state is changed, and the timer then starts a new time check When the ignition switch 1a is on, the timer Tm1 is reset, and the electric source control shifts to the above-mentioned normal mode.

In case the IG switch is off and the door state is not changed (a door is not opened or closed) more than the predetermined time (time Tl), it is likely that people are not in the vehicle or near the vehicle, so the lamp main relay 3 is set to its off state so as to prevent battery death. Furthermore, even if the IG switch is off, if the door state is changed, it is likely that people are in the vehicle or near the vehicle, so the ECU resets the timer Tm1 and the electric source control shifts to normal mode.

(c) In case the ignition switch is off, and a door is not closed more than a predetermined time after the door is opened:

The door/interior dome lamp control part 2c counts time from when the door is opened until when it is closed. In case the door is not closed more than time T2, which is predetermined by the timer Tm2, and when the interior dome lamp switch 11 is changed to the DOOR-mode, the ECU turns the interior dome lamp 5 and the door lamp of the opened door off so as to prevent battery death.

The timer Tm2 is reset and starts a new time check when other doors are opened. Also, when the ignition switch 1a is on or all doors are closed, the timer Tm2 is reset and the above-mentioned normal control is performed.

That is, if the ignition switch is off, and when a door is not closed more than the predetermined time (T2) after that door is opened, it is likely that one or more people have left the vehicle with a door that is not completely closed. Therefore, the ECU turns the door lamp(s) of the opened door(s) and the interior dome lamp 5 off. In case another door is opened while the timer Tm2 is counting, the ECU resets timer Tm2 and it starts a new time check. Thereby, the ECU makes timer Tm2 start a time check if another door is opened even when the first door is still open.

Figure 3:
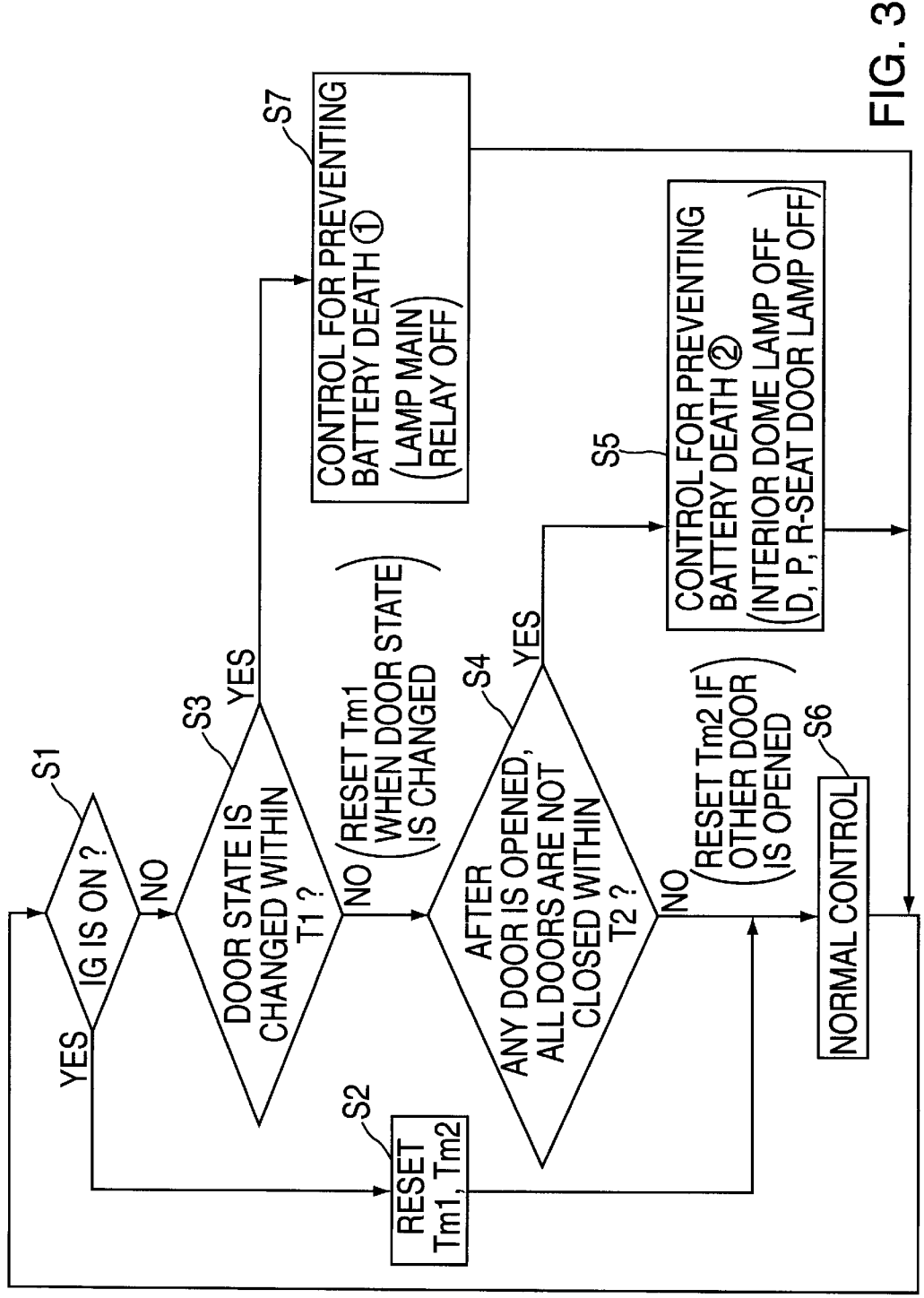
FIG. 3 is a flowchart showing a process of the first preferred embodiment according to the present invention.
Figure 4:
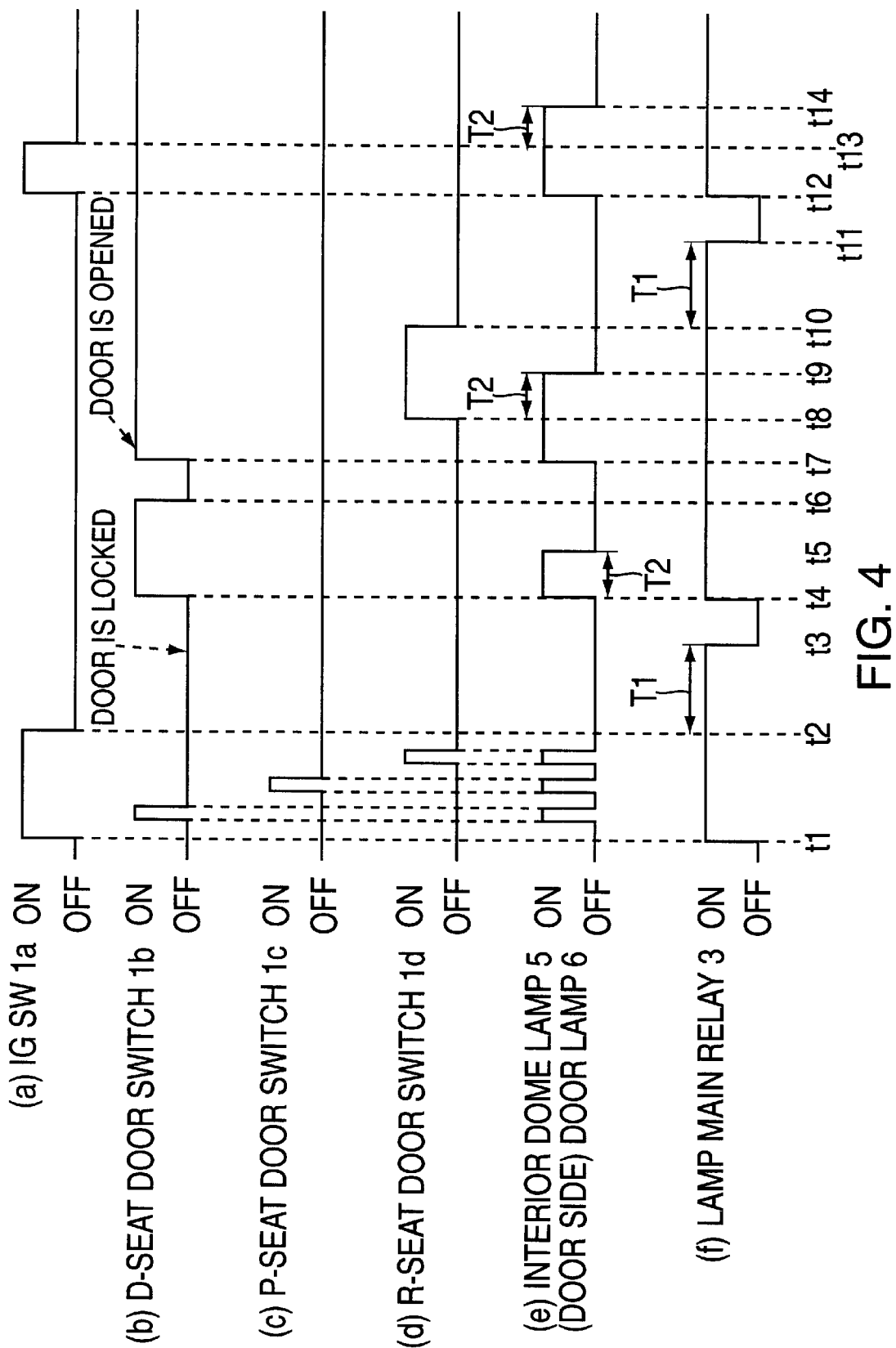
FIG. 4 is a time chart showing an operation of the first preferred embodiment according to the present invention.

FIG. 3 is a flowchart showing a control process for preventing battery death according to the present invention, and FIG. 4 is a time chart showing a control operation for preventing battery death according to the present invention.

In FIG. 4, sequence (a) illustrates opening and closing sequence of the IG switch 1a; sequences (b), (c) and (d) illustrate opening and closing sequences of the D-seat door switch 1b, the P-seat door switch 1c, the R-seat door switch 1d; sequence (e) illustrates a turn on/off light sequence of the interior dome lamp 5 and the door lamps 6a, 6b, 6c; and sequence (f) illustrates an operation sequence of the lamp main relay.

The operation of the present invention will be explained in detail with reference to FIG. 3 and FIG. 4. When the IG switch 1a is on (from t1 to t2 in FIG. 4) the timers Tm1, Tm2 are reset and normal control is performed (Step S1, S2, S6 in FIG. 3). That is, as illustrated in FIG. 4, the lamp main relay 3 operates, the door lamps 6a, 6b, 6c of D-seat, P-seat, R-seat and the interior dome lamp 5 are turned on or off in response to the door state of the D-seat, the P-seat, the R-seat door switch 1b, 1c, 1d, respectively.

When the IG switch 1a is off at time t2, the timer Tm1 starts to count time. After the predetermined time T1 of timer Tm1 has passed while the door state is not changed, the electric source control is shifted to a control mode for preventing battery death (1) at time t3 (Step S3, S7 in FIG. 3).

Specifically, output from the lamp main relay control part 2b sets the lamp main relay 3 in its off state, as illustrated in FIG. 4. Thereby, the electric source supply to the lamp system is cut off.

Then, in this example, the D-seat door opens at time t4. When the door switch 1b of the D-seat is on, as the door state is changed, the ECU resets the timer Tm1, as illustrated in FIG. 3, and the electric source control is shifted to normal control mode from the mode for preventing battery death (1). Therefore, the lamp main relay 3 is on and electric power is supplied to each lamp system.

On the other hand, the timer Tm2 stats a time check. After the predetermined time T2 of timer Tm2 has passed while the D-seat door is still not closed (time t5 in FIG. 4), the operation goes to S5 from S4 in FIG. 3, and the electric source control is shifted to a control mode for preventing battery death (1). Therefore, the interior dome lamp 5 and door lamp 6a in response to the D-seat door are turned off.

Next, the D-seat door is closed at time t6 and the D-seat door switch 1b is off. At this time, as the door state is changed, the timer Tm1 is reset and starts a new time check. As all doors are closed, the timer Tm2 is reset and the electric source control is shifted to a normal control mode from the control mode for preventing battery death (2).

And next, the D-seat door is opened at time t7, the timer Tm1 is reset and starts a time check together with Tm2. Then, at time t8 the R-seat door is opened and the R-seat door switch 1d is turned on. As the door state is changed, the timer Tm1 is reset. Also, the timer Tm2 is reset because another door is opened and the timers Tm1, Tm2 start a time check again. Even after the predetermined time T2 of the timer Tm2, in case the R-seat door is still not closed, the electric source control is shifted to the control mode for preventing battery death (2), as mentioned above. Therefore, the interior dome lamp 5 and the door lamp 6a, 6b in response to the D-seat and the R-seat door are turned off.

At time t10, the R-seat door is closed and the R-seat door switch 1d is off, the timer Tm1 is reset and starts a time check. At time t11, after the predetermined time T1 of timer Tm1 has passed while the door state is not changed, the electric source control is shifted to the control mode for preventing battery death (1) as mentioned above, and the lamp main relay 3 is off; therefore the electric source supply to the lamp system is cut off.

After that, at time t12, the IG switch is on, the operation goes to step S2 from step S1 and the timer Tm1, Tm2 are reset and the electric source control is shifted to normal control mode.

At t13, the IG switch 1a is off again. As the D-seat door switch is still on, the timer Tm2 starts a time check. When the D-seat door is not closed even after the predetermined time T2 of timer Tm2, the electric source control is shifted to the control mode for preventing battery death (2) from the normal control mode, and the door lamp 6a in response to the D-seat door is turned off.

Figure 5:
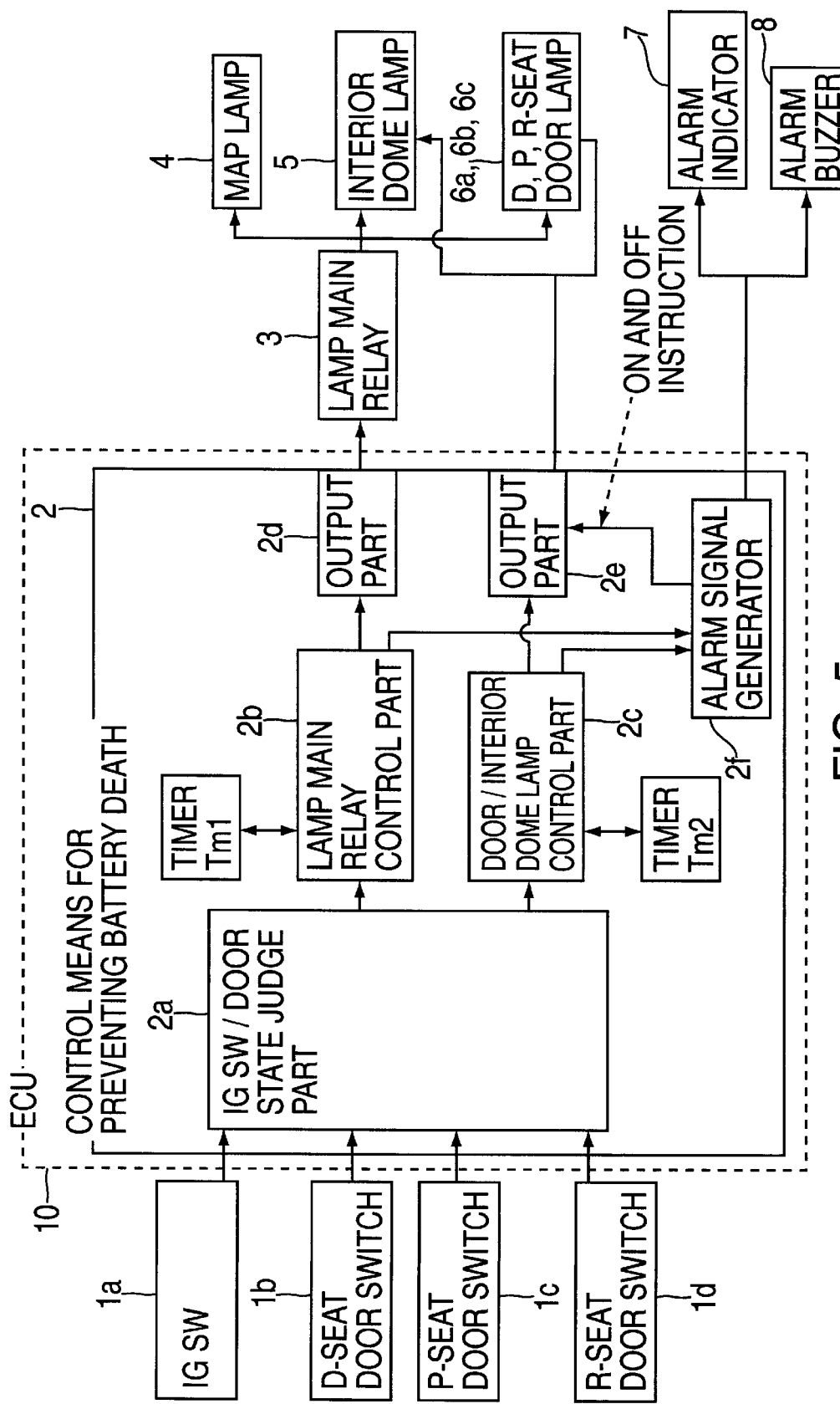
FIG. 5 is a block diagram of the second preferred embodiment according to the present invention.

FIG. 5 illustrates a block diagram of the second preferred embodiment according to the present invention. Here, an alarm signal generator 2f and an alarm indicator 7 or an alarm buzzer 8 are added to the first embodiment. Other elements are the same as those illustrated in FIG. 1.

Figure 6:
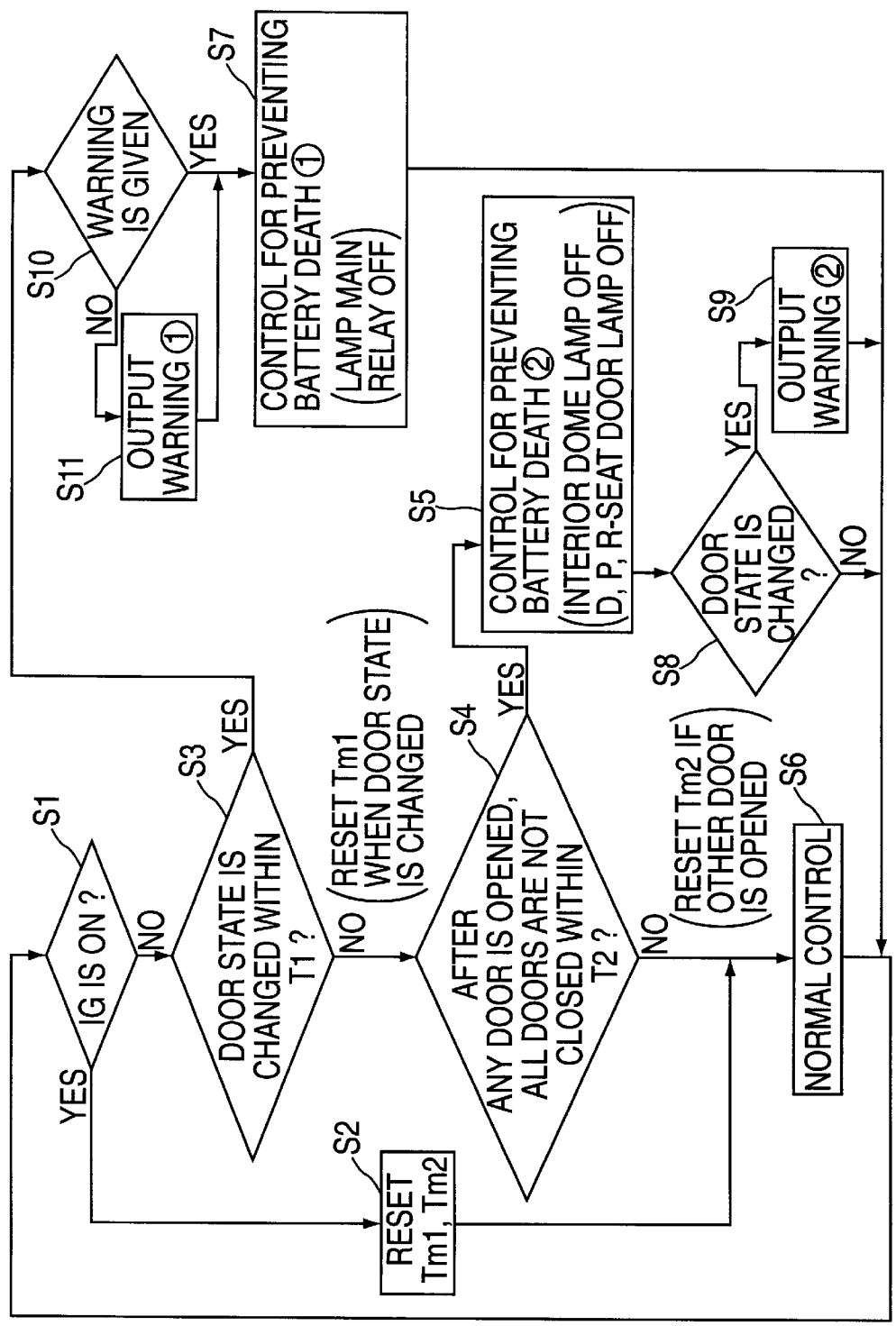
FIG. 6 is a flowchart showing a process of the second preferred embodiment according to the present invention.

FIG. 6 illustrates a flowchart showing a process of the second preferred embodiment according to the present invention. Here, steps S8, S9, S10, S11 are added to FIG. 3 so as to give a warning that operation is shifted to the control mode for preventing battery death (1) or operation is under the control for preventing battery death (2).

The alarm generator 2f operates as follows:

(a) As illustrated in FIG. 6, the alarm generator 2f checks to see whether the ECU has already given a warning or not before electric source control shifts to the control mode for preventing battery death (step S10). If it has not been given, a warning (1) is outputted. The output method of the warning (1) is, for example, lighting the alarm indicator 8, sounding the alarm buzzer 9 or switching on and off the interior dome lamp 5.

According to this operation, at the time when electric source control is shifted to the control for preventing battery death (1) even when the interior dome lamp etc. is suddenly turned off, users don't have to be puzzled as mentioned above.

(b) In the control mode for preventing battery death (2), the ECU checks out the door state (step S8) as illustrated in FIG. 6. When the door state is changed, a warning (2) is outputted (step S9). The output method of the warning (2) is, for example, lighting the alarm indicator 8, sounding the alarm buzzer 9 or turning on and off the interior dome lamp 5.

As mentioned above, when a door state is changed while the ECU is in the control mode for preventing battery death (2), the warning (2) makes users realize that the control for preventing battery death is in operation even in case the interior dome lamp etc. are turned off. Also, vehicle mechanics are able to judge whether the control system is out of order or the control for preventing battery death (2) is in operation when the ECU is inspected for trouble in the manufacturing line or during maintenance.

Here, any one of "an alarm indicator", "an alarm buzzer" or "turning on and off an interior dome lamp" or combination of these may be used for generating the warning (1), (2). Also, the generating method for a warning signal may be changed in the control for preventing battery death (1) and (2).

INDUSTRIAL APPLICATION

As mentioned above, an electric source control device for a vehicle according to the present invention turns lamps which are on in response to a door state automatically off, in case the ignition switch is off and when the door is not closed within a predetermined time after the door is opened. Thereby, an interior dome lamp and door lamps are not left on even with a door that is not completely closed, and battery death can be prevented.

Also, the electric source control device for a vehicle according to the present invention cuts off electric source supply to a lamp system of a vehicle by turning a switching circuit off, in case the ignition switch is off and when a door state is not changed during a predetermined time. Thereby, battery death caused by leaving an interior dome lamp and map lamp on can be prevented.

Further, the electric source control device for a vehicle according to the present invention generates an alarm signal to inform a user that the vehicle has shifted to a control mode to prevent battery death, before the control means enters such control mode. Thereby, users don't have to be puzzled when the interior dome lamp is suddenly put off.

Furthermore, the control device for electric source according to the present invention generates an alarm signal in response to the door state to inform users that the vehicle is in a control mode for preventing battery death when the control means is in such control mode. Thereby, users can realize that the control mode for preventing battery death is operational. Also, when vehicle mechanics inspect an ECU for trouble in the manufacturing line or during maintenance, they are able to make an immediate judgment whether the control system is out of order or the control system for preventing battery death is operational.

What is claimed is:

1. In an electric source control device for a vehicle having an ignition switch, a door switch which is switched on or off in response to opening and closing of doors, a door lamp which is turned on or off in response to the door switch, an interior dome lamp which is turned on or off in response to the door switch or selectively turned on or off by manual operation, and a map lamp which is selectively turned on or off by manual operation, comprising:

a unit for preventing battery death which is electrically connected to each of the ignition switch, the door switch, the door lamp, the interior dome lamp and the map lamp, further comprising:
  a judging part for detecting an on or off condition of the ignition switch and the door switch;
  a first timer for measuring the lapse of time after being reset by the opening of any of the doors in case the ignition switch is off;
  a first control part for turning the door lamp and the interior dome lamp off in response to the output of the first timer when a first predetermined time period has lapsed, and for outputting a first alarm signal, based on a signal from the judging part when any of the doors is opened or closed after the interior dome lamp is turned off with the first control part; and
  an alarm unit which is electrically connected to the unit for preventing battery death, wherein the unit for preventing battery death operates the alarm unit based on the first alarm signal.

2. In an electric source control device for a vehicle having an ignition switch, a door switch which is switched on or off in response to opening and closing of doors, a door lamp which is turned on or off in response to the door switch, an interior dome lamp which is turned on or off in response to the door switch or selectively turned on or off by manual operation, and a map lamp which is selectively turned on or off by manual operation, comprising:

a unit for preventing battery death which is electrically connected to each of the ignition switch, the door switch, the door lamp, the interior dome lamp and the map lamp, further comprising:
  a judging part for detecting an on or off condition of the ignition switch and the door switch;
  a first timer for measuring the lapse of time after being reset by the opening of any of the doors in case the ignition switch is off;
  a first control part for turning the door lamp and the interior dome lamp off in response to the output of the first timer when a first predetermined time period has lapsed, and for outputting a first alarm signal, based on a signal from the judging part when any of the doors is opened or closed after the interior dome lamp is turned off with the first control part;
  a second timer for measuring the lapse of time after being reset by the opening or closing of any of the doors in case that the ignition switch is off;
  a second control part for turning the door lamp, the interior dome lamp and the map lamp off in response to the output of the second timer when a second predetermined time period has lapsed, and for outputting a second alarm signal, on a signal from the judging part before the lamps are turned off with the first control part; and
  an alarm unit which is electrically connected to the unit for preventing battery death, wherein the unit for preventing battery death operates the alarm unit based on the first alarm signal and the second alarm signal.

* * * * *